May 19, 1964  J. S. KALLER  3,133,737
SPREADER FOR ARTIFICIAL FERTILIZERS AND OTHER GRANULAR MATERIAL
Filed May 18, 1962  2 Sheets-Sheet 1

INVENTOR
Johan Sigurd Kaller

BY *Glascock, Downing + Seebold*

ATTORNEYS

May 19, 1964 J. S. KALLER 3,133,737
SPREADER FOR ARTIFICIAL FERTILIZERS AND OTHER GRANULAR MATERIAL
Filed May 18, 1962 2 Sheets-Sheet 2
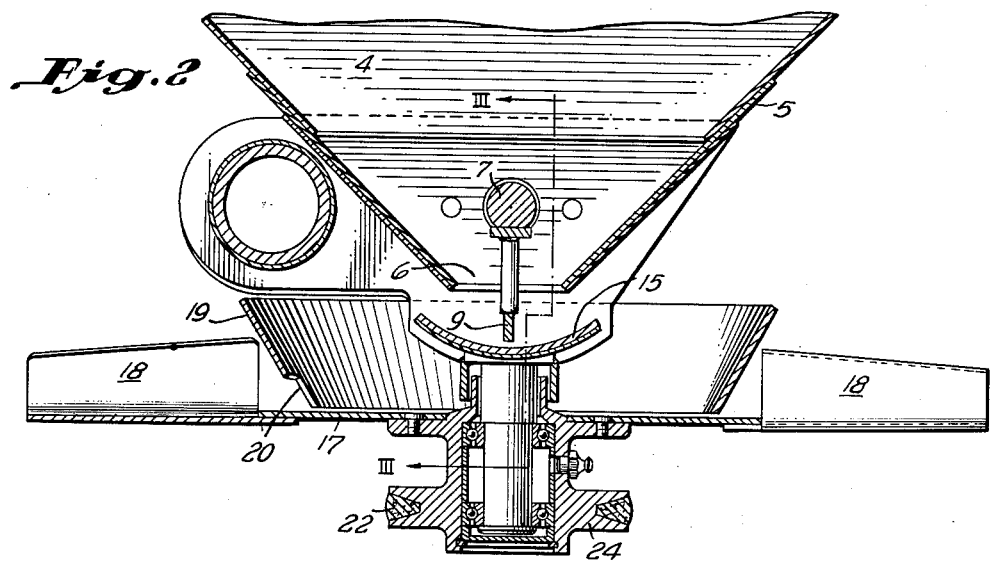
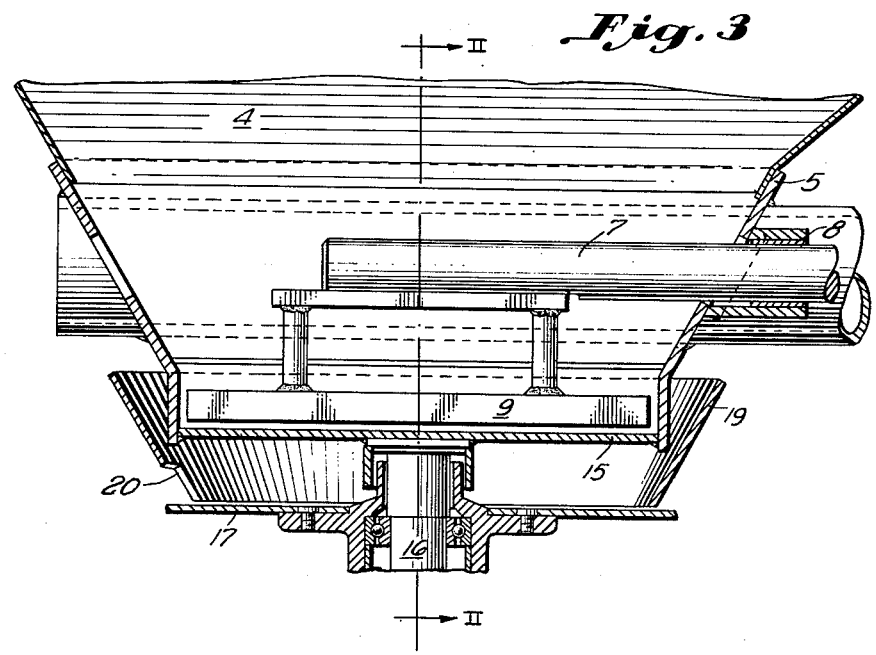
INVENTOR
Johan Sigurd Kaller
BY Glascock Downing & Seebold
ATTORNEYS United States Patent Office 3,133,737
Patented May 19, 1964

3,133,737
SPREADER FOR ARTIFICIAL FERTILIZERS AND OTHER GRANULAR MATERIAL
Johan Sigurd Kaller, Vadursgatan 2A, Linkoping, Sweden
Filed May 18, 1962, Ser. No. 195,832
Claims priority, application Sweden Jan. 29, 1962
5 Claims. (Cl. 275—8)

The present invention relates to a spreader for artificial fertilizers and other granular materials, and one object of the invention is to produce a spreader of this type which is simple and sturdy and which, despite the small width of the machine, spreads the material evenly over a comparatively wide area.

The invention is described below in detail in connection with the attached drawings, in which:

FIGURE 2 is a section taken along line II—II of FIGURE 3, and

FIGURE 3 is a section taken along the line III—III of FIGURE 2.

Figure 1:
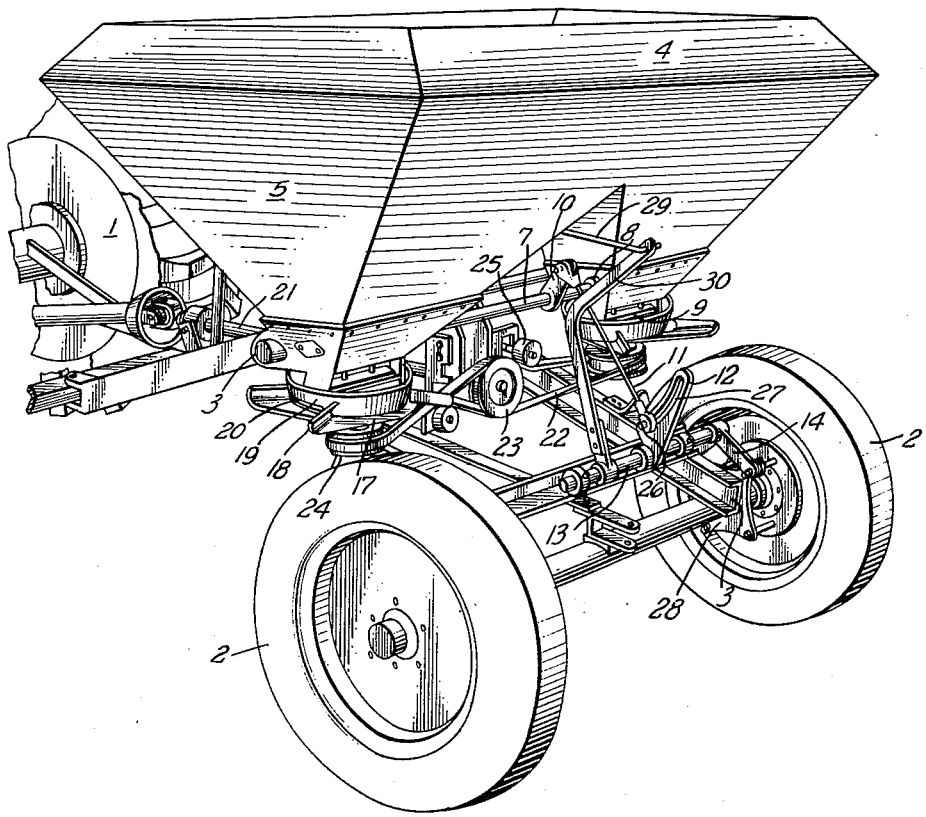
FIGURE 1 is a perspective view of a spreader constructed in accordance with the invention and connected to a tractor, seen obliquely from the rear.

The spreader illustrated and connected behind a tractor 1 is constructed in the form of a cart supported on two wheels 2, and framework 3 carries a tank 4 for the artificial fertilizer or the material to be spread. The tank is constructed in the form of two juxtaposed hoppers 5, each having an ejection opening 6 in the bottom. Above the ejection openings is a shaft 7 extending in the transverse direction of the spreader between the hoppers and to some extent into the latter. The shaft is mounted rotatably in the bearing 8, with each part of the shaft inside the hoppers supporting its feeding blade 9. An arm 10 projecting from the shaft between the hoppers is connected by a connecting rod 11 to a projecting plate 12 on a shaft 13 mounted rotatably in the framework between the wheels 2. An arm 14 projecting from the right end of the shaft in the drawing is held by a spring (not shown) against a cam plate 28 having four cams fitted to the inside of the right wheel, and is thereby turned four times to and fro, i.e. rocked or oscillated in opposite directions, on each revolution of the wheel. The feeding blades 9 then move to and fro or are oscillated in opposite directions immediately above their plates 15, which plates are fitted respectively in the lower part of the feeding opening 6 and have an upper surface concentric with the shaft 7. The blade now moves a quantity of material forwards over the edge of the plate at each stroke, and the material drops on to a driven rotor mounted rotatably under the plate around a vertical shaft 16. The rotor consists of a horizontal plate 17, in the outer parts of which a number of ejecting scoops 18, installed approximately radially, are fitted in the form of channels, open in the direction of rotation. The plate 17 forms the bottom of a bowl with a stationary projecting conical or cylindrical wall 19 fitted into the machine. In the lower edge of the wall there are one or more apertures 20 through which passes the material dropping from the plate 15, due to centrifugal force of the rotation of the rotor, to the ejecting scoops. The quantity of material fed out by the blades can be controlled by adjusting rear joint 26 of the connecting rod 11 away from or towards the shaft 13 along a radial slot 27 in the plate 12, by means of which the deflection of the oscillation of the blades can be altered.

The two rotors are driven by a shaft 21, directed towards the rear and connected to the power output of the tractor, by means of a V-belt 22 revolving around V-belt pulleys 23 mounted on the rear end of the shaft 21, and V-belt pulleys 24 mounted on the lower end of each rotor. As the V-belt pulleys 23 and 24 are disposed in planes forming an angle with respect to one another, special tension rollers 25 are necessary which guide the V-belts between the different V-belt pulleys.

The two rotors 17 mounted slightly within and above the wheels 2 are connected to the shaft 21 in such a way that their rear parts (in relation to the direction of driving) rotate in opposite directions. By suitable adjustment of the position and size of the apertures 20 in the wall 19, material will pour out through such apertures when the machine is driven across a field, and will then be ejected by the ejecting scoops 18 over a spreading area which is considerably wider than the width of the machine and over which the material is distributed fairly evenly. As the rear parts of the rotors rotate in opposite directions, the area between the rotors will also be covered with material. With this machine a spreading width of seven or eight meters can be attained with a machine that is about two meters wide.

If the conical or cylindrical wall 19 is disposed to rotate around its center line, it is possible to control the position of the apertures 20, and thus the direction in which the ejecting scoops eject the greater part of the material. The apertures 20 can also be equipped with dampers by means of which the size and to some extent the position of that part of the apertures that is freed by the dampers can be regulated. Such a damper may consist of a rotatable ring, mounted concentrically with respect to the wall 19, and provided with apertures corresponding to the apertures 20.

The ejecting scoops 18 can be fitted at an angle to the positions parallel to the respective radii, by which means a suitable range of ejection action and of the release of the material from the scoops can be obtained.

By fitting a cable 29 to a bar 30 projecting from the shaft 13 and extending the cable to the driver's seat on the tractor, the driver can, against the action of the spring acting on the shaft 13, turn the arm 14 away from the cam plate 28, so that the turning action of the cam plate on the arm ceases, thereby stopping the feeding blades 9 and the feeding of the material. The driver must at the same time disconnect the power output of the tractor, thus stopping the rotors 27.

In order that the material should not run down through its own weight and due to the vibration of the machine through the feeding opening 6 and over the edge of the plate 15, into the bowl formed by the plate 17 and the wall 19 and over the edge of the wall, the edges of the plate 15 and of the wall 19 must be of sufficient height that such a flow is prevented and that for example the machine can be driven back to its base without first emptying the tank 4.

The invention can of course be modified within the scope of the invention. Thus, in one type, the machine can be constructed to be carried on the tractor, in which case the blades 9 can receive their rotational motion from a connecting-rod connected to the power output of the tractor.

I claim:

1. In a spreader for artificial fertilizers and other granular materials, a tank for containing the material to be spread, said tank having a feeding opening in the bottom thereof, a rotor mounted below said feeding opening, ejecting scoops on the rotor extending radially thereof, means for driving said rotor, feeding means within said tank, said feeding means including a horizontal shaft extending into the tank and located above said feeding opening, means operably connected with said shaft for oscillating said shaft in opposite directions, a blade carried by said shaft, and a fixed component positioned below the feeding opening between said blade and rotor and having an arcuate surface concentric to the axis of said shaft for preventing the direct passage of material from the feeding opening to the rotor, with the oscillating movement of the blade serving to move a quantity of the material over the edges of the fixed component onto the rotor.

2. The spreader as claimed in claim 1, in which the edges of said fixed component are of sufficient height as to prevent the material due to its own weight falling through the feeding opening and over such edges when the feeding means is inoperative.

3. The spreader as claimed in claim 1, including ground wheels for said tank and said means operably connected with said shaft for oscillating said shaft in opposite directions includes a cam plate driven by one of said wheels, an arm urged against said cam plate, and means operably coupling said shaft with said arm.

4. The spreader as claimed in claim 3, including a connecting rod connected at one end to said shaft, and adjustable joint means coupling the other end of said connecting rod to said arm for adjusting said rod toward and away from said shaft for controlling the magnitude of deflection of said blade.

5. The spreader as claimed in claim 3, including operating means for swinging said arm away from said cam plate to arrest the oscillating movement of the shaft.

References Cited in the file of this patent

UNITED STATES PATENTS

| | | |
|---|---|---|
| 407,657 | Henrichsen | July 23, 1889 |
| 594,091 | Matteson | Nov. 23, 1897 |
| 1,107,992 | Parrish | Aug. 18, 1914 |
| 2,958,531 | Stokland | Nov. 1, 1960 |
| 2,989,314 | Larson | June 30, 1961 |
| 3,025,068 | Lely et al. | Mar. 13, 1962 |
| 3,038,643 | Lely et al. | June 12, 1962 |
| 3,041,076 | Lely et al. | June 26, 1962 |